Sept. 8, 1970   H. THÜMMEL   3,527,933
FLAT ELECTRICAL CONNECTING ELEMENT
Filed Dec. 28, 1967   3 Sheets-Sheet 1
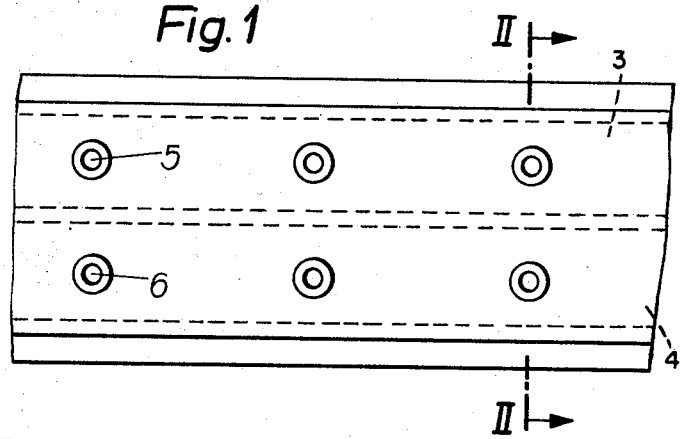
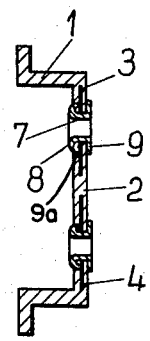
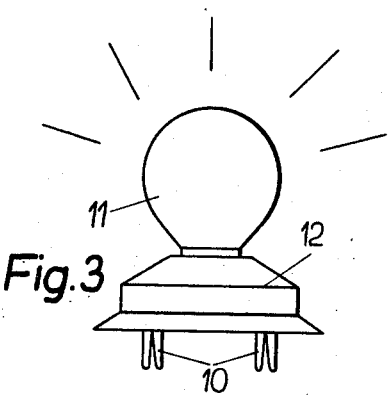
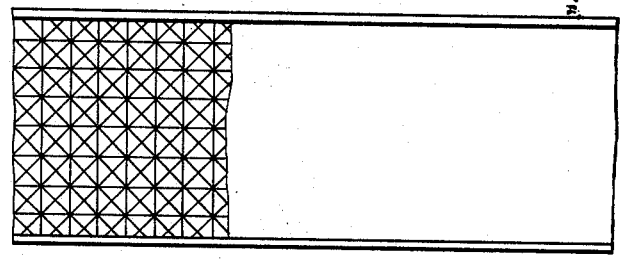

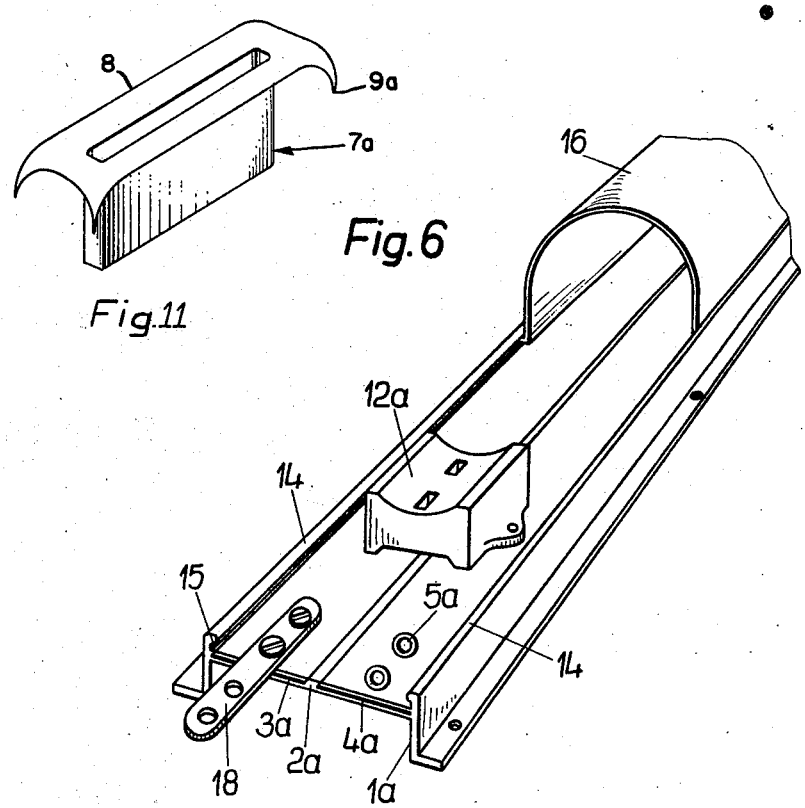
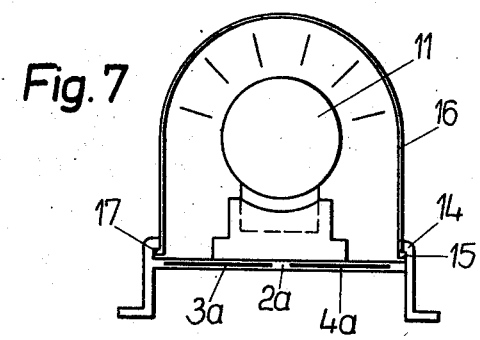

Sept. 8, 1970 H. THÜMMEL 3,527,933
FLAT ELECTRICAL CONNECTING ELEMENT
Filed Dec. 28, 1967 3 Sheets-Sheet 3
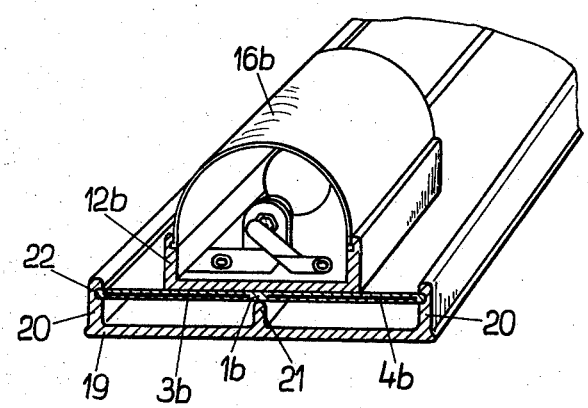
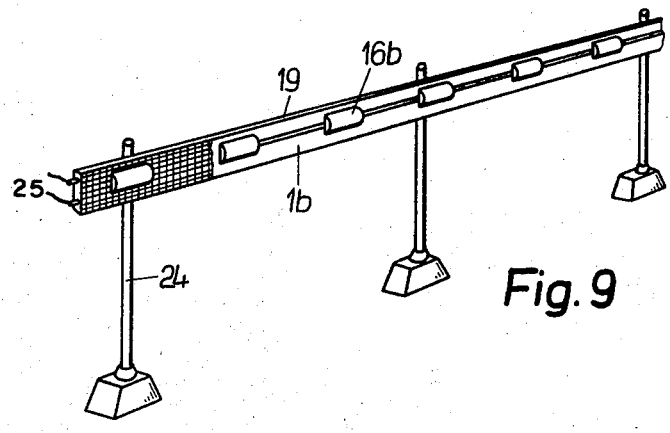
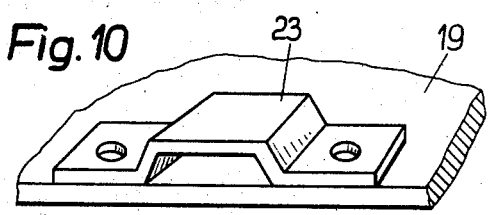

United States Patent Office

3,527,933
Patented Sept. 8, 1970

3,527,933
FLAT ELECTRICAL CONNECTING ELEMENT
Helmut Thümmel, Ehingen (Danube), Germany, assignor to Firma Heinrich Benzing, Ehingen (Danube), Germany, a firm of Germany
Filed Dec. 28, 1967, Ser. No. 694,342
Claims priority, application Germany, Dec. 28, 1966, B 90,499
Int. Cl. F21i 15/06
U.S. Cl. 240—11.2                                16 Claims

ABSTRACT OF THE DISCLOSURE

A flat sheet of plastic, preferably pliable and shape-retaining, has a pair of flat, conductive foils embedded in the sheet, each one of the foils forming one conductor. Metallic connection sockets can be inserted piercing the plastic sheet, and making connections with the metallic foil as they pierce the composite sheet-foil. The connecting elements are preferably formed with separate connecting prongs. The foil may be adhered, or strapped to flat surfaces such as road signs, advertising material, or formed as a strip with side rails to accept U-shaped transparent covers, covering lamp plug-in assemblies to fit into the connectors.

---

The present invention relates to a flat electrical connecting element made out of plastic material, and more particularly to a connecting strip into which connection sockets, to accept connection plugs or light sockets and the like can be inserted at random.

The electrical connecting element of the present invention may, in addition, be formed with reflective surfaces, so that the electrical element, itself, can form a direction sign into which illuminating elements can be plugged directly.

Electrical connection elements, and plug-in strips are usually prepared by retaining electrical current conductors, bus bars, stranded wires and the like in an insulating housing, and connect separately manufactured outlets thereto. Strip-form electrical connectors are also known into which plugs can be inserted, one right next to each other. The form, and appearance of such plug-in units is largely governed by the size and shape of the connecting plugs with which they are to be used. Due to the substantial size of such connecting plugs, the number of connections which can be made is limited and the manufacture of such connecting elements is relatively expensive, such elements also being of considerable weight.

It is an object of the present invention to provide an electrical connecting element into which socket elements can be inserted at random locations, permitting a plurality of connecting points, which is flexible, inexpensive, and readily adapted to a variety of uses.

SUBJECT MATTER OF THE PRESENT INVENTION

Briefly, in accordance with the present invention, a flat strip of non-conductive plastic sheet material has a pair of flat conductive foils embedded therein. Metallic connection sockets are inserted through the plastic, piercing the sheet material and the conductive foils, and extending transversely through the flat sheet, the connection sockets being adapted to receive standard plugs and together forming outlets.

The flat sheet of plastic material is preferably flexible, or pliable, so that it can be bent to conform to a curved surface. The conductive foils may be of reflective material, and stamped in prismatic form, thus providing for an optically reflective surface, making the connecting element particularly suitable to have lamp sockets plugged into the connection sockets, and providing a self-reflecting surface, for example for use as direction signs, traffic directions, advertising signs and the like. The metallic connection sockets, forming outlets and into which lamps or other units can be plugged, can be located at random and in connection with the desires of the user.

The connecting element of the present invention is useful not only outdoors, the plastic being assentially impervious to deterioration, but also indoors, for example in shops or installations where a plurality of connections are to be placed in accordance with varying requirements, such as laboratories, or as a current supply unit for various electrically operated appliances, toys, and the like. Since the connecting element, in the plastic, is flexible, it can be used as a cover for structural elements while at the same time providing electrical connections for outlets to be placed thereon, or a flat and decorative conductor of substantial current carrying capability.

If the foils are formed as a plurality of strips, a multiplicity of circuits can be built up; two of the strips can be connected to the "white" and "black" lines, respectively, and a third one to ground, to accept standard grounding plugs; or, more strips can be located next to each other, to be separately controlled by separate switches.

By forming the plastic sheet in strip-form and providing lateral, transversely extending side rails, covers can be placed over the connection sockets; these covers can be flat, to merely provide for insulation and prevent accidental touching of exposed metallic parts (if these parts are not, themselves, plastic-coated for insulation), or they may be substantially U-shaped, and transparent, to accept lamp sockets plugged into the connection sockets and thus provide for a covered light fixture, in which the lamps are placed in accordance with the desires, or requirements of the user.

The structure, organization, and operation of the invention will now be described more specifically with reference to the accompanying drawings, wherein:

FIG. 1 is a plan view of a portion of the connecting element in accordance with the present invention;

FIG. 2 is a cross section along lines II–II of FIG. 1;

FG. 3 is a perspective view of a connecting plug with a lamp socket;

FIG. 4 is a plan view of a conductive element, with a reflector, partly broken away;

FIG. 5 is a cross sectional view of FIG. 4;

FIG. 6 is a perspective view of another embodiment of the present invention;

FIG. 7 is a cross sectional view of a connecting element of FIG. 6;

FIG. 8 is a different embodiment of the form of the connection in accordance with FIG. 6;

FIG. 9 shows an application of the connection element applied to road side illumination, in perspective view;

FIG. 10 is a cross sectional view of the back portion of FIG. 9; and

FIG. 11 is a perspective, partly schematic view of a connecting element for flat prongs.

Referring now to the drawings and in particular to FIGS. 1 and 2: A sheet of plastic material 1, which may be in the form of a channel, so that its cross section is substantially U-shaped, has a cross piece 2. Two parallel strips of conductive foils 3, 4, for example of aluminum, are embedded in the strip of plastic 1. As shown in FIG. 1, foils 3, 4 are elongated strips, of for example the same width, arranged parallel to each other, and adapted for connection to a source of power. Of course, three strips can be used, with a center strip provided for connection to a ground. The cross sectional area of the conductors 3, 4, may be the same, or may differ; additional parallel strips can, of course, be arranged in a sheet, and connected to the same or different circuits internally or externally (as will appear hereafter).

In the region of the conducting strips 3, and 4, respectively, openings 5, 6 are formed, aligned in pairs to receive connection elements 7 (FIG. 2) forming sockets to receive electrical plugs. One side of socket 7 is formed with a transversely extending flange 9, lying against one surface of strip 1; the other side is bent over, as seen at 8, to form a secure connection with the plastic strip 1. Either the flange 9, or the bent-over side 8 may be formed with vertically extended piercing points 9a, which penetrate the plastic 1 to make a good and secure electrical contact with the conductive foils 3, 4, respectively. These bentover ends 9a are preferably slightly longer than the distance from the top surface of plastic sheet 1 to the conductive foils 3, 4. The sockets 7 can be inserted directly through the plastic, by piercing the plastic, with or without any tool, and the inner ends, at 8, merely bent back. The top surface of the flange 9, with the exception of the prongs 9a are preferably covered with an insulating plastic to provide protection against accidental contact. If the prong ends 9a are formed at the bottom of the insert sockets 7, so that the bent-over end 8 engages, hook-like into the plastic 1 and makes contact with the connecting foils 3, 4, then the entire flange 9 can be covered with insulating coating.

The distance between the pairs of the openings 5, 6, is arranged to be the same as the distance between the prongs 10 of a standard plug. FIG. 3 illustrates a plug unit having round prongs 10, and a socket element 12 for a light bulb 11. Placing the prongs 10 into sockets 7 enables connection of the light bulb at any socket location. The sockets, themselves, can be punched through either at a factory, at convenient distances, for random insertion of the plug units 10, or they can be provided to a user, for insertion directly by piercing through the plastic. A socket 7a for use with flat prongs is shown at FIG. 11.

FIGS. 4 and 5 illustrate the use of the plastic sheet in combination with an optically reflecting foil. A reflector 13 is formed by embossing the conductors 3, 4, in prismatic form. The plastic 1 may be wholly transparent, or at least transparent from one surface to the metallic conductive foil.

FIGS. 6 and 7 illustrate a strip-form electrical connecting element. A strip of plastic 1a, corresponding essentially to the strip 1 of FIG. 1, has metallic foils 3a, 4a embedded therein, and is formed with connecting holes 5a. The conductors are formed in a cross piece 2a of the plastic strip. In addition thereto, the plastic strip is formed with longitudinally extending side rails 14, having a notch 15 therebeneath, which are resiliently bendable. A protective covering 16 of transparent, resilient plastic and having projecting edges 17 can be snapped into the grooves 15 of the side rails 14 to provide a protective covering. Of course, flat plates of plastic can also be used to cover openings 5a, or any sockets 7 inserted into the electrical connecting element to provide additional protection against contamination by dirt, moisture, against mechanical damage, or against accidental contact. Transparent U-shaped covers are preferred when plug-in light socket units are used with the connecting strip, to provide protection for the light bulbs.

The strips shown in FIG. 6 can be provided in predetermined length, for example 3 ft., 6 ft. or so; for interconnection of successive strips, interconnecting elements 18 are provided which can be screwed into a pair of successively arranged openings 5a, as best seen in FIG. 6; of course the interconnecting elements 18 may again be formed with downwardly projecting engagement pins, or the screws through the plastic may have counter nuts, with washers having projecting prongs to engage through the plastic and make contact with the foils 3a, 4a. Holes 5a need not be pre-formed but can be made by piercing through the plastic material either by the screws or by any sharply pointed tool, such as an awl, pointed scissors, a knife or the like. Again, flat cover plates can be placed over the connecting strips 18, or they can be otherwise protected by plastic covering coating or the like. The sockets 12a can be formed to accept outlets, light sockets, or may be formed as terminal sockets for fluorescent tubes.

FIGS. 8 to 10 illustrate a form of the invention for use outdoors, for example as an illuminated guide-rail in a road installation. A pair of contact foils 3b, 4b are arranged within a stirp of plastic material 1b. The plastic strip 1b is retained in a groove 22 formed in upstanding guide rails 20 of a plastic retaining element 19. The plastic retaining element may have a central ridge 21 to provide for additional stiffness and support of the plastic strip 1b in which the conductive foils are embedded. The strip 1b can merely be snapped into the grooves 22 after outward bending of the resilient plastic rails. Light contacts 12b, having protective hoods 16b, again in U-shape, are then plugged into the assembly of strip 1b and holding strip 19 as before, by means of connection sockets 7, (not shown in FIG. 8). The entire assembly, supported on roadside supports 24, and preferably formed with the reflective, prismatically embossed conductors provides an effective, illuminated guide strip for traffic control. Additional stiffening strips 25 (FIG. 9), which may also provide for additional, current carrying or signalling conductors, can be placed in the channels formed between the plastic strip 1b and the backing of the plastic channel 19. Holding straps 23 to go around supports 24 can readily be secured to the backing strip 19, as best seen in FIG. 10.

The plastic sheet need not be an elongated strip, but may be a flat plate, the conductors being arranged therein in circular, or spiral form, for application of sockets, or connections thereto at random locations. If the sheet is flexible, and not too springy, it can be applied directly to curved surfaces, or form flat conductive strips for interconnection of circuits to be located remotely, and without interfering with decorative aspects. It is a particular advantage of the structure of the present invention that flexible and elastic plastic insulation material can readily be pierced so that contact sockets can be located at random places without requiring any special installations or tools. The plastic insulation material can be made in such a way that it is formed with a self-closing deformable top layer, so that a contact socket, removed from the connecting element (after straightening the hook-formed ends 8 thereof), will not leave a hole. The opening across the hole will close again, thus providing protection against contamination or accidental access to the embedded foil. The foil, being wider than the actual connecting elements, will of course continue to carry current to other connecting elements, even upon removal of one or the other connecting sockets. To prevent accidental contact by projecting contact prongs with the back, for example if the entire contacting element is to be applied to a metallic surface, a self-adhering additional plastic layer can be placed on the back, or insulating strips similar to strip 19 (FIG. 8) can be supplied, of plastic material and of sufficient depth to accept and contain standard connecting prongs of electrical plugs.

The electrical contact connecting element has been described particularly in connection with contact strips. Various modifications and changes may be made, within the scope of the invention, in dependence on specific user requirements.

I claim:
1. Flat electric element comprising
a flat sheet of plastic, non-conductive material (2);
a pair of flat, conductive foils (3, 4( formed as adjacent parallel strips separated from each other by said plastic material and embedded in said sheet of material;
and metallic connecting sockets (7) arranged on said strip in aligned pairs to accept two-prong connecting plugs, passing through said sheet of material in the region of said conductive foils and extending transverse to said flat sheet.

2. Flat electric element according to claim 1 wherein said connecting sockets have socket elements, a transverse flange adapted to lie at a surface of said sheet of plastic material, said flange being secured to said socket element; and piercing points (9a) extending from said flange in a direction towards the conductive foils, and of sufficient length to extend through the portion of the plastic sheet material (2) from said surface to said foil, to pierce said foil and make an electrical contact.

3. Flat electric element according to claim 1 wherein said connection sockets have a socket element, a transverse flange adapted to lie against a surface of said sheet material and secured to said socket element, said socket element extending through said sheet material and having an end portion crimped over the other surface of said plastic sheet material to secure said element to said sheet.

4. Flat electric element according to claim 1 wherein said sheet of plastic material having said foils embedded therein is pliable.

5. Flat electric element according to claim 1 where at least one surface of said sheet of plastic material having said foil embedded therein is formed with a reflective surface (13).

6. Flat electric element according to claim 1 wherein said sheet of flexible material is an elongated strip; and electrical lamp sockets inserted in said metallic connection sockets, said elongated strip forming an elongated strip-type conductor and a mechanical support for said lamp sockets.

7. Flat electric element according to claim 1 including interconnecting elements secured to the terminal edge of said sheet, said interconnecting elements being in electrically conductive connection with said foils embedded in said sheet, said interconnecting elements being mechanically secured to said sheet material.

8. Flat electric element according to claim 7 wherein the terminal edge of said sheet is formed to receive an interconnecting element of another sheet.

9. Flat electric element according to claim 7 wherein said interconnecting elements are metal strips; and separable means including screw connections securing said metal strips mechanically to said sheet and electrically to said foils embedded thereto, to provide for mechanical and electrical interconnection of a pair of strips.

10. Flat electric element according to claim 1 wherein said sheet of flexible material forms an elongated strip; and an elongated U-shaped hood of transparent plastic material is provided and removably secured to said strip and extending thereover to provide a cover for lamps plugged into the connection sockets in said strip.

11. Flat electric element according to claim 1 wherein said sheet of flexible material forms an elongated strip; a pair of transversely extending side rails are provided, formed integral with said strip; and protective cover elements resiliently retained between said transversely extending rails at least in the region of said metallic connection sockets piercing said strip.

12. Flat electric element according to claim 11 wherein said cover elements are U-shaped hoods made of transparent material and resiliently removably retained against said side rails, said U-shaped hoods forming transparent covers for light-sockets inserted in said metallic connection sockets.

13. Flat electric element according to claim 11 wherein said side-rails are formed with grooves; and said cover elements have portions matching said grooves to be resiliently retained therein.

14. Flat electric element according to claim 1 wherein at least one of said flat conductive foils is of optically reflective material and prismatically embossed to form a reflective surface; and said flat sheet of plastic material is transparent at least in the region between one surface and said foil.

15. Socket element arranged to pierce flexible sheet-form plastic material having an electrical conductor embedded therein, said socket element comprising a hollow socket member, a flange extending from one end of said socket member in a direction transversely thereto and adapted to lie against one surface of said sheet; the other end of said hollow member being formed for crimping over the other surface of said sheet.

16. Socket element according to claim 15 wherein said other end is formed with a flange having projecting piercing points to engage with said electrical conductor.

References Cited
UNITED STATES PATENTS

| | | | |
|---|---|---|---|
| 2,692,375 | 10/1954 | Carson | 240—10 |
| 2,875,421 | 2/1959 | Jordan. | |
| 3,109,598 | 11/1963 | Morgan | 240—8.2 |
| 3,140,831 | 7/1964 | Strange | 240—8.16 |

NORTON ANSHER, Primary Examiner

R. L. MOSES, Assistant Examiner

U.S. Cl. X.R.
240—2; 339—21, 59